United States Patent
Kovalev et al.

(10) Patent No.: US 10,891,668 B2
(45) Date of Patent: Jan. 12, 2021

(54) METHOD AND APPARATUS FOR A LOCKOUT MECHANISM TO PREVENT OPERATING A SYSTEM IN REAL-TIME

(71) Applicant: CC App Holdings, Inc., New York, NY (US)

(72) Inventors: Andrey Kovalev, Queens, NY (US); Ayan Roy, New York, NY (US)

(73) Assignee: CC App Holdings, Inc., New York, NY (US)

(*) Notice: Subject to any disclaimer, the term of this patent is extended or adjusted under 35 U.S.C. 154(b) by 98 days.

(21) Appl. No.: 15/454,822

(22) Filed: Mar. 9, 2017

(65) Prior Publication Data

US 2017/0262912 A1 Sep. 14, 2017

Related U.S. Application Data

(60) Provisional application No. 62/305,953, filed on Mar. 9, 2016.

(51) Int. Cl.
  *G06Q 30/02* (2012.01)
  *G06Q 30/06* (2012.01)
  *G06Q 20/38* (2012.01)
  *G06Q 20/40* (2012.01)

(52) U.S. Cl.
  CPC ....... *G06Q 30/0607* (2013.01); *G06Q 20/387* (2013.01); *G06Q 20/405* (2013.01); *G06Q 20/4033* (2013.01); *G06Q 30/0213* (2013.01)

(58) Field of Classification Search
  None
  See application file for complete search history.

(56) References Cited

U.S. PATENT DOCUMENTS

| | | | | |
|---|---|---|---|---|
| 2006/0271439 | A1* | 11/2006 | Goldberg | G06Q 30/02 705/14.15 |
| 2009/0157515 | A1* | 6/2009 | Lafauci | G06Q 20/20 705/15 |
| 2014/0005825 | A1* | 1/2014 | Maisto | G06Q 20/367 700/236 |
| 2015/0088672 | A1* | 3/2015 | Song | G06Q 20/042 705/15 |
| 2017/0098174 | A1* | 4/2017 | Venigalla | G06Q 10/02 |
| 2017/0098264 | A1* | 4/2017 | Priebatsch | G06Q 20/3224 |

OTHER PUBLICATIONS

"OmniSplit: A mobile food ordering platform for restaurant staff and patrons" (published on Jun. 8, 2015 and available at https://scholarcommons.scu.edu/cgi/viewcontent.cgi?article=1046&context=cseng_senior) (Year: 2015).*

* cited by examiner

*Primary Examiner* — James M Detweiler
(74) *Attorney, Agent, or Firm* — Dentons US LLP

(57) ABSTRACT

A technique is provided that dynamically controls the speed at which a mobile device user can use funds. More specifically, the technique provides a lockout mechanism, which temporarily prevents the mobile device user from accessing and thus spending the funds.

11 Claims, 7 Drawing Sheets

METHOD AND APPARATUS FOR A LOCKOUT MECHANISM TO PREVENT OPERATING A SYSTEM IN REAL-TIME

CROSS-REFERENCE TO RELATED APPLICATION(S)

This patent application claims priority from U.S. provisional patent application Ser. No. 62/305,953, filed Mar. 9, 2016, the entirety of which is incorporated herein by this reference thereto.

TECHNICAL FIELD

This invention relates generally to the field of mobile devices in communication with a cloud computing system. More specifically, this invention relates to a lockout mechanism of the mobile device by the cloud computing service to prevent use of the system.

BACKGROUND

Currently, cloud computing services and systems are configured to track transmissions of transactions statically. For example, in an online deal marketplace that connects members with vendors and facilitates discounted payments, whether members have reached the limit prescribed by the vendors is determined by counting the number of transactions statically against the predetermined limit.

SUMMARY

A technique is provided that dynamically controls the speed at which a mobile device user can use funds. More specifically, the technique provides a lockout mechanism, which temporarily prevents the mobile device user from accessing and thus spending the funds.

DETAILED DESCRIPTION

Figure 1:
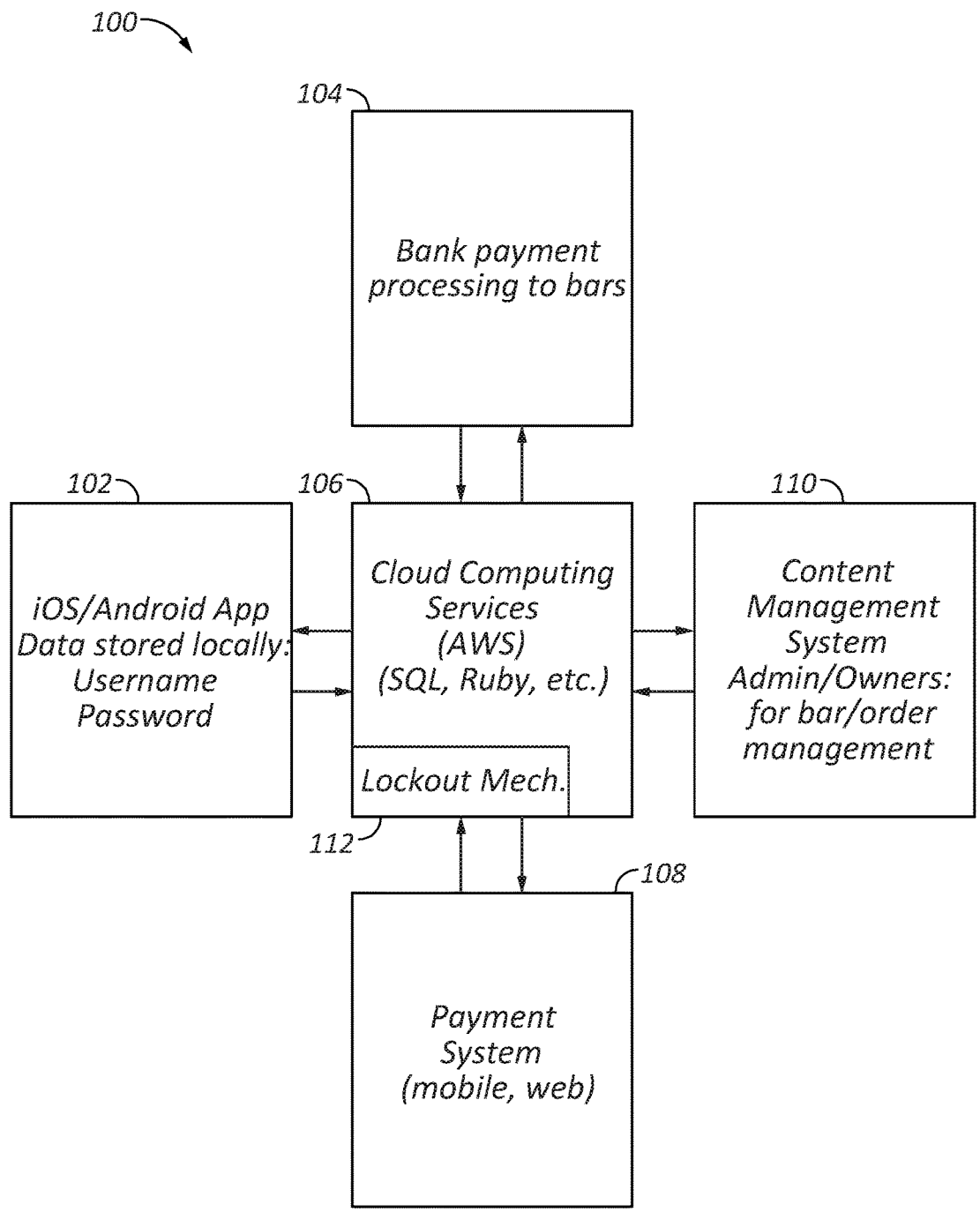
FIG. 1 is a block schematic diagram of a configuration of cloud computing system with a lockout mechanism to prevent operating the system in real time according to an embodiment.

A technique is provided that dynamically controls the speed at which a mobile device user can use funds. More specifically, the technique provides a lockout mechanism, which temporarily prevents the mobile device user from accessing and thus spending the funds.

Currently, cloud computing services and systems are configured to track transmissions of transactions statically. For example, in an online deal marketplace that connects members with vendors and facilitates discounted payments, whether members have reached the limit prescribed by the vendors is determined by counting the number of transactions statically against the predetermined limit.

However, the prior art transactions systems are limited in that they are static. For example, a merchant system that provides coupons to potential customers only has the ability to count or control the number of units a potential customer can have. For instance, the merchant system can set variables such that the customer can only purchase three items of a particular item. Also, such prior art transactions systems are limited with regard to payment transactions. For example, such systems are configured to process a discounted payment based on a static, predetermined discount amount.

With the above prior art transactions systems, there is no ability to control the speed at which a user can use his funds. Also, there is no ability to control dynamically the discounted payment of a customer and combine it with a membership fee related payment of the cloud computing system.

To address these and other disadvantages the innovation described herein provides a technique that is different from the prior art systems. The innovation described herein factors in real-time information and uses such real-time information to throttle the transactions. The technique controls when the user can operate the system. The technique can determine, e.g. based on reading parameters that can be changing in real-time, how much the payment to the vendor should be from the user and how much should be from the membership fee related account. Also, the technique monitors and incorporates the consumed amount of credit limit.

An example embodiment for understanding the innovation is described with respect to FIGS. 1-4. The context is a consumer ordering drinks at a bar using his mobile device. The innovation prevents the user from using the system, e.g. ordering more drinks with alcohol, more than is safe within a particular time. In addition, the technique combines this lockout mechanism with a system that incentivizes users to purchase more drinks by offering discounts to the users and additional payments to the merchant from a membership fee related account.

It should be appreciated that such context is for illustrative purposes only and is not meant to be limiting. For example, another context may be controlling how many songs a user can listen to from an application on his mobile device within a time frame. e.g. the system only allows the user to listen to three songs within a half-hour, even though the system incentivizes the user to purchase more credits and receive greater discounts for those additional purchased credits.

Another exemplary implementation is a system that provides navigation services on a user's mobile device, where the user is a member of an elite navigation service that provides real-time local information. As the user executes the elite navigation service, the system determines, in real-time based on user location, the payment amount to route to the vendor of the service. A payment transaction can be routed each time the user enters a different, pre-designated geographical area. The system also determines in real-time the membership related fee to route to the vendor of the service. The system can turn off, make idle, or otherwise prevent the user from using the elite navigation service based on dynamic criteria that the system tracks in real-time. Examples of what the system can track in real-time include but are not limited to current available bandwidth of the network connection, current battery life of the mobile device's battery, the temperature of the mobile device itself, the number of transactions allowed per time period, and so on.

It should be appreciated that the system is adaptive and interactive in real-time. The system controls the ability of the user to engage with the system and complete transactions, to throttle the transactions. The system controls the ability of the user to operate the system, to access whatever is the functionality of the system. The functionality is heated based on the lockout mechanism. The system provides automatic interference with operation of the system. The lockout elements control the operation of the machine.

An embodiment of the innovation can be described with reference to FIG. 1, a block schematic diagram of an exemplary configuration 100 of cloud computing system with a lockout mechanism to prevent operating the system in real time. That is, FIG. 1 is the database system and data interaction model. In this configuration, the mobile device 102 is communicatively connected to the cloud computing services or system 106. System 106 includes the lockout mechanism 112. Cloud computing service 106 is communicatively connected to or, alternatively, includes a mobile or Web payment system 108. Also, cloud computing services 106 is configured to route to and receive transmissions from various the payment processing systems of various banks 104. Cloud computing services 106 is communicatively connected to a content management system 110 such as by an interface.

With reference to FIG. 1, mobile device 102 can be a standard mobile device which can store authentication criteria for cloud computing services 106. For example, mobile device102 can store the username and password for automatically logging into and executing the application for cloud computing services102.

Cloud computing services 106 can be built and configured using standard application languages, database languages, web services, and application programming interfaces (API's). An example of such cloud computing service is Amazon Web Service (Amazon Web Services, Inc., Seattle, Wash.). Lockout mechanism 112 can be configured using any of the application languages, database languages, web services, and application programming interfaces (API's).

Content management system 110 allows the administrator or owner of the configured cloud computing service 106 to set, add, delete, or otherwise modify parameters used by cloud computing services 106. A standard content management system is for example Webflow (Webflow, Inc., San Francisco, Calif.). For example, the owner can research and determine the legal alcohol limit per unit of time and set appropriate parameters of lockout mechanism 112 accordingly. In addition, as an example, the owner can assign various coupon values based on previously used coupon values, the membership fee, adjusted membership fees, whether the lockout mechanism was activated during a given time period, or how many times the lockout mechanism was activated during the time period, and so on.

Payment system 108 can be derived from or be a standard payment systems such as for example Braintree (Braintree, Chicago, Ill.).

Bank payment processing system 104 can be a standard bank such as for example Chase (Subsidiary of JPMorgan Chase, New York, N.Y.).

Figure 2:
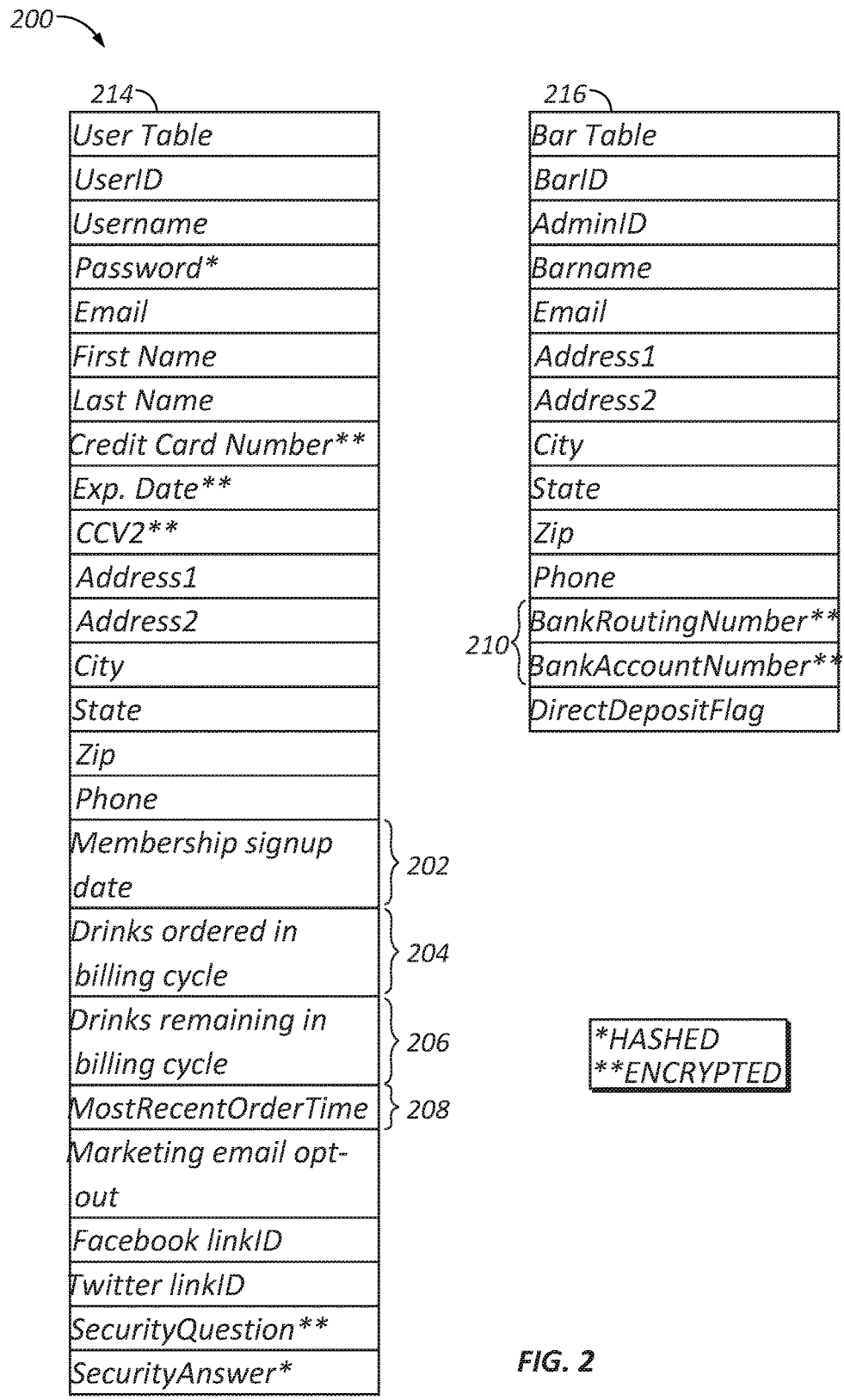
FIG. 2 is a block schematic diagram of database schema design according to an embodiment.
Figure 2:
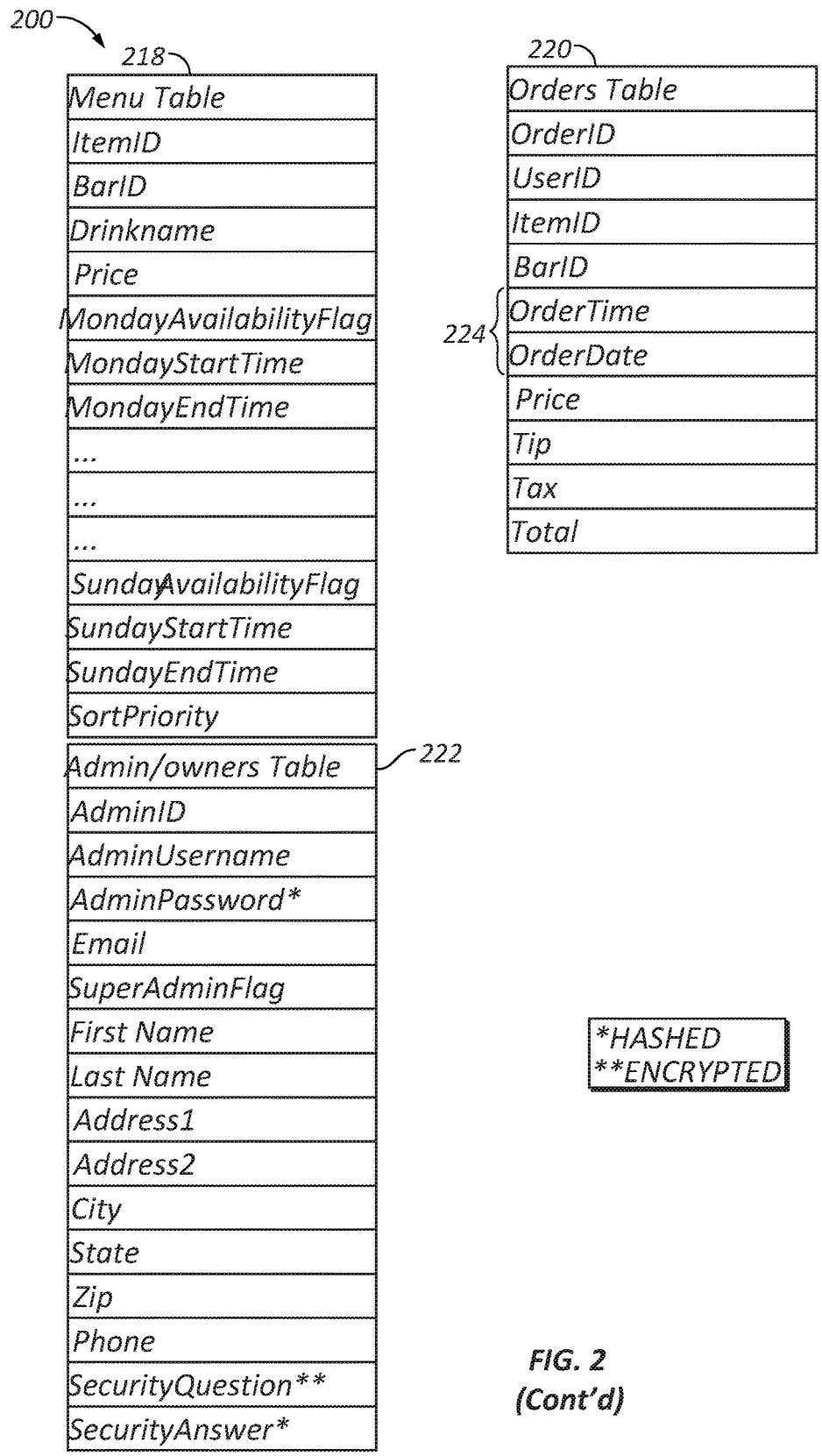

An embodiment of the innovation can be described with reference to FIG. 2, a block schematic diagram of an exemplary database schema design 200. That is, FIG. 2 is the data storage and warehouse model. The context for this application is for use at a bar. Exemplary database schema design 200 includes at least five tables: User Table 214, Bar Table 214, Menu Table 218, Orders Table 220, and Admin/owners Table 222. Admin/owners Table 222 and Menu Table 218 hold standard data associated with each type of table. For example Admin/owners Table 222 comprises data with respect to user authentication and security.

In addition to other fields, User Table 214 contains membership sign-up date 202, drinks ordered in billing cycle 204, drinks remaining in billing cycle 206, and most recent order time 208. Any of, any combination of, or all of such data can be used by cloud computing services 106 to determine when to activate lockout mechanism 112 and/or the discounted payment from mobile device 102 and the membership fee related amount from within cloud computing services 106.

In addition to other fields, Bar Table 216 contains the bank routing number and the bank account number (collectively, 210). Such numbers 210 are used to route payment authorized by the user 212A by way of mobile device 102 and are used to route payment authorized by and preset by the bar admin/owners 110.

In addition to other fields, Orders Table 220 contains the time of an order and the date of the order (collectively 224). This data can also be used to route payment authorized by the user 212A by way of mobile device 102 and are used to route payment authorized by and preset by the bar admin/owners 110.

Figure 3:
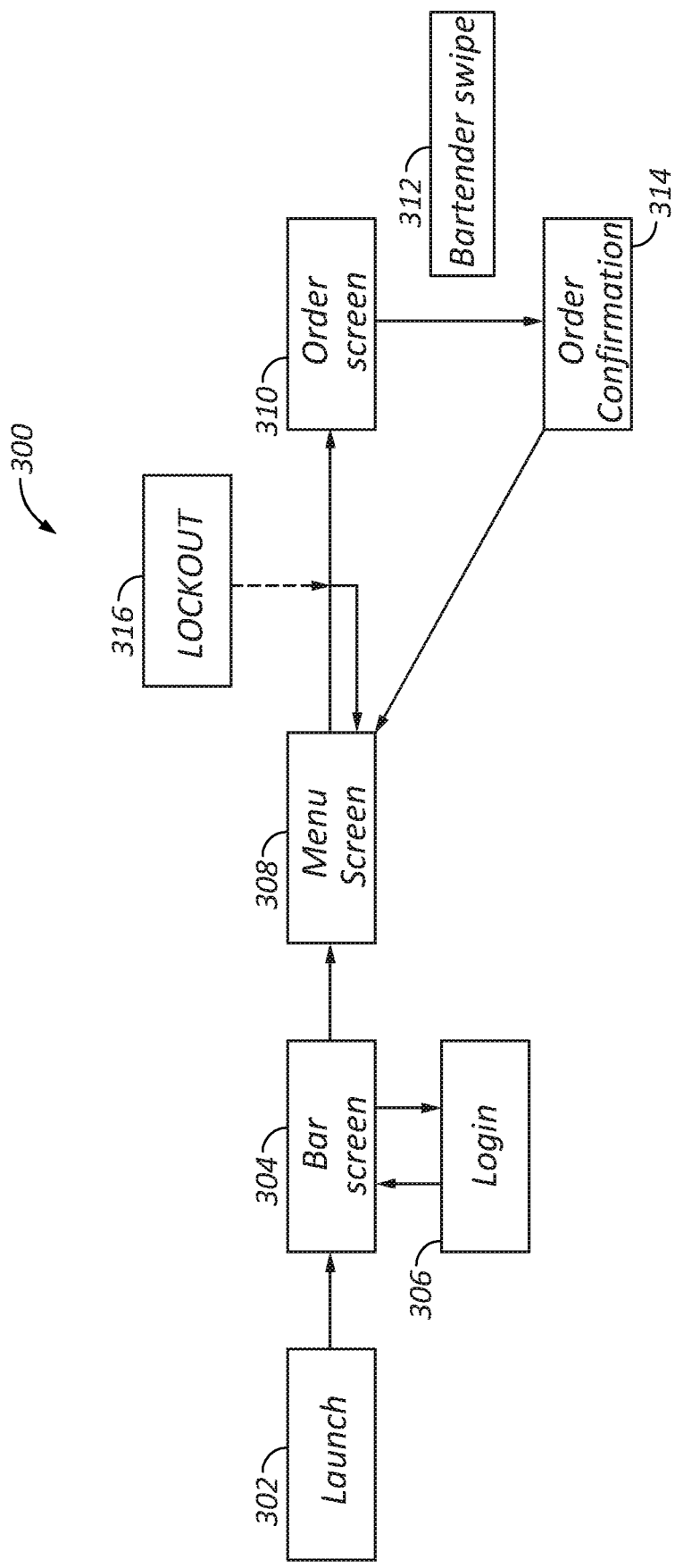
FIG. 3 is a flow diagram showing the cloud computing system's dynamic lockout process according to an embodiment.

An embodiment of the innovation can be described with reference to FIG. 3, a flow diagram showing the cloud computing system's dynamic lockout process 300. That is, FIG. 3 is the flow process and use cases for the application. The dynamic lockout process 300 begins with the launch of the membership application 302 such as for example an application for all the bars belonging to a particular membership. At step 304, the home screen of the application is displayed, such as for example a home screen for the bar membership. At step 306, a login window or interface element is displayed for the user to login to the membership application. At step 308, the application displays a menu screen having a collection of bars in the membership. For example, the menu screen can show a list of bars or can show a collection of icons, each icon representing a particular bar. At step 310, and order screen is displayed in response to an item on the menu being selected. For example, the user selects Bourbon to order. The order screen displays the discounted price in accordance with the membership on its screen. In one embodiment the order screen contains machine-readable data representing the purchase of the drink such as for example a barcode. At step 312, mobile device 102, which is showing the order screen is swiped by the bartender's machine in order to complete the order transaction. It should be appreciated that the order transaction can be communicated from mobile device 102 to the bartender's machine via haptic technology, the mobile device tapping the bartender's machine, etc. At step 314, the order has been confirmed and control returns to the menu screen at step 308.

The user can continue to order drinks from the menu screen at step 308. As each order is placed the application collects, stores, and computes various statistics. For instance, the application tracks what type of drinks had been ordered and when they had been ordered. Using this information the application can determine that as the user attempts to order another drink it is time to activate lockout mechanism 112. Thus for example lockout mechanism 112 may show menu screen 308 as idle. For instance the interface elements on the menu screen may be temporarily inactive. As another example the interface elements may be temporarily inactive and also lighter in color has compared to when they are active. In another embodiment a notification window may display indicating that the ordering capability is disabled for a specific amount of time. In another embodiment the notification window may display a countdown clock which counts down until the time that the user can place the next order. In another embodiment the application can cause the mobile device to vibrate when the ordering capability is re-enabled.

Figure 4A:
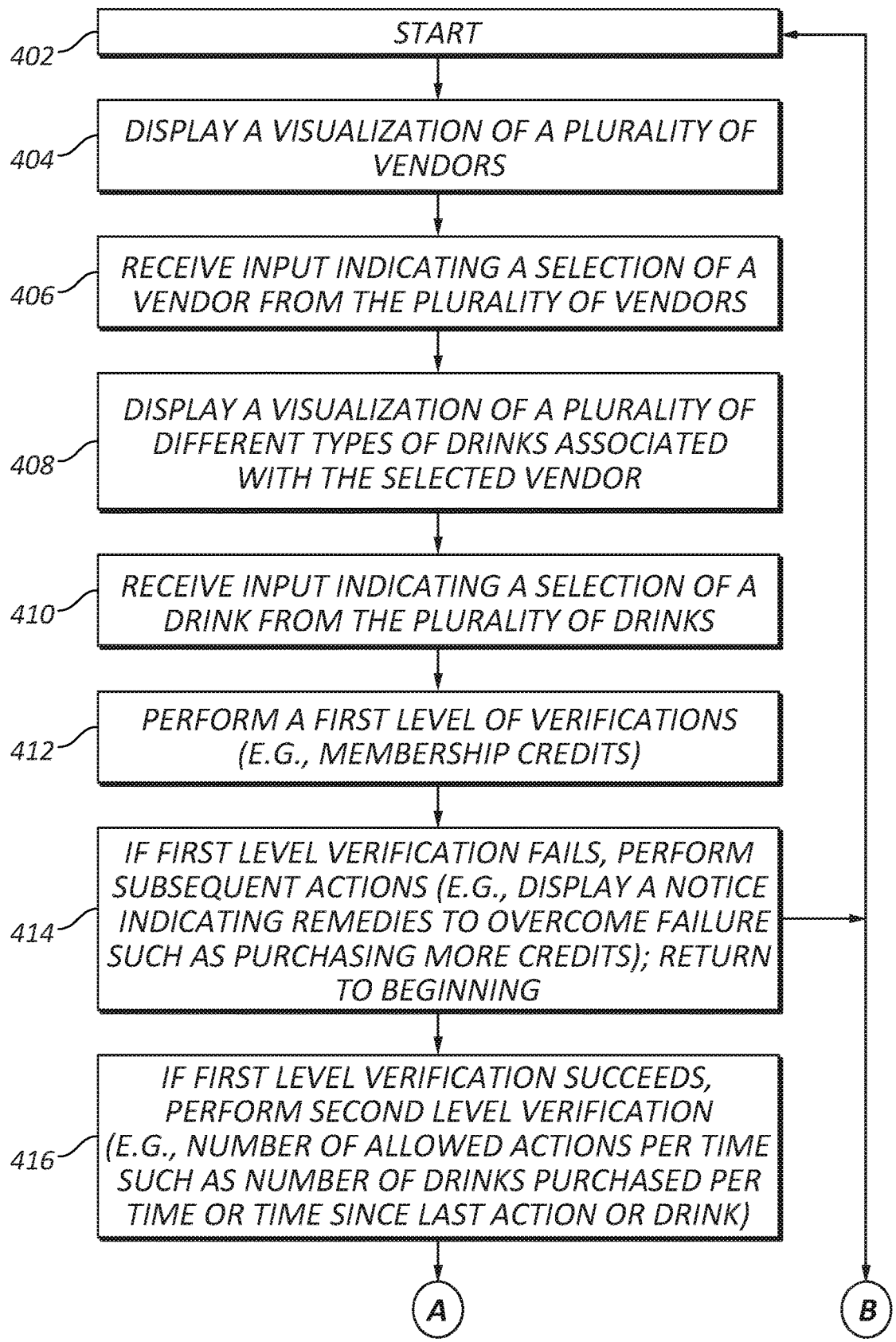
FIGS. 4A-4B is a single flow diagram showing an expanded dynamic lockout process according to an embodiment.
Figure 4B:
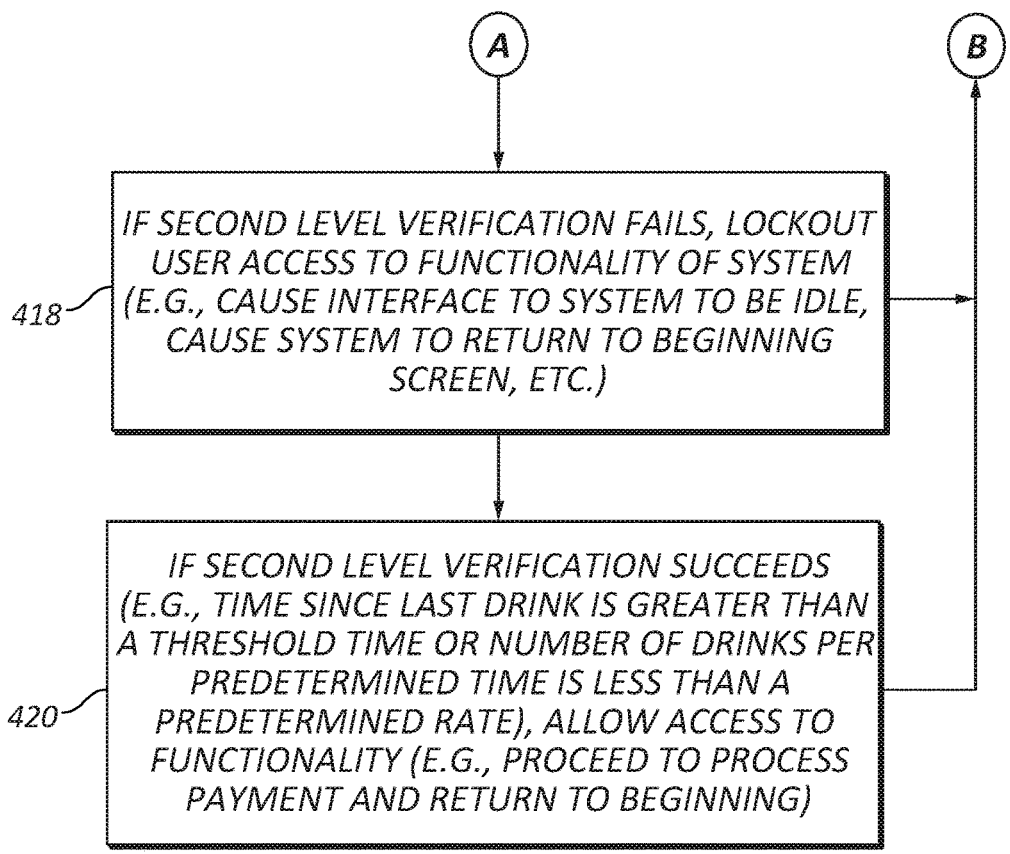

An embodiment of the innovation can be described with reference to FIGS. 4A-4B, a single flow diagram showing an expanded dynamic lockout process. At step 402 the process starts. At step 404, the system displays a visualization of a plurality of vendors. For example the vendors can be bars belonging to a particular bar membership. At step 406, the system receives input indicating a selection of a vendor from the plurality of vendors. At step 408, the system displays a visualization of a plurality of different types of items, such as for example alcoholic drinks, associated with the selected vendor. At step 410, the system receives input indicating a selection of an item, such as an alcoholic drink, from the plurality of items (drinks). At step 412, the system performs the first level of verifications. For instance, the system verifies the number of credits the user has towards purchasing one or more drinks at a discounted price due to the membership. At step 414, if the first level verification fails, then the system performs subsequent actions that have been previously set for example by setting particular rules. As an example, if the user does not have enough credits towards purchasing a drink using his membership status, the system can display a notice indicating remedies to overcome such failure such as displaying an message encouraging the user to purchase more credits. Then control returns to the beginning of the process at step 402. At step 416, when the first level verification succeeds the system performs a second level of verification. Examples of the second level of verification include whether the number of allowed drinks purchased for time is below a predetermined acceptable rate. Another example is if the time since the last drink is greater than a predetermined acceptable length of time. At step 418, if the second level verification fails, then the lockout mechanism is activated. For example, the lockout mechanism prevents the user from having access to certain functionality of the system such as for example from having access to purchasing more alcoholic drinks. The system can cause the interface to ordering drinks to be idle, can cause the system to return to the menu screen or the beginning screen, etc. At step 420, if the second level verification succeeds, for example if the time since the last drink is greater than a predetermined, threshold time or if the number of drinks per a predetermined time is less than a predetermined rate, the system allows the user to have access to certain functionality. For instance user can complete the order transaction and allow the system to proceed to process payment. In this example, after the order transaction is complete the system returns to the beginning of the process. It should be appreciated that these steps can be performed in different order and still be within scope of the innovation.

An Exemplary Embodiment

An exemplary embodiment can be understood with reference to FIGS. 1-3. In the embodiment, a membership program is integrated with a mobile payment solution via a redistribution of payments that is controlled by a lockout period, a maximum amount of discounts, and a discount level within a period of time. For illustrative purposes only, the discussion below may refer to the vendor as a bar and the items offered by the vendor as alcoholic drinks. However, these details are for illustrative purposes and are not meant to be limiting.

Coupons, whether paper or electronic, are a popular means of saving money on goods and services. Coupons alone, however, do not drive repeat business to vendors. They are only a means to get people to purchase a good or service via a one-time discount. Membership programs solve this problem to some extent—they offer multiple discounts to individual vendors. However, these membership programs are limited because they only offer discounts to the one vendor where the membership is provided by the vendor itself, or the user only receives a maximum and capped discount or capped amount of purchases set by the vendor or program. The innovation described herein solves that problem, as the vendor receives a larger amount of funds than the discount amount that the user receives. For example, the vendor can give a 50% discount but makes back more than 50% via the additional redistributed funds from the membership fees. Vendors collect the full discounted cost from the users as well as a predetermined amount from the app, which is collected and paid from the summation of all membership fees. The app then goes into a lockout mode for a predetermined amount of time. During this period, the user cannot purchase more drinks and must wait for the lockout period to be completed before making a subsequent purchase. The market currently seemingly fails to offer a redistribution payment that incentivizes repeat customer purchases and provides value for both the app user and vendor, while also incorporating such a lockout system.

The innovation is a membership program via a mobile application that gives the app user an agreed upon quantity of discounts at an agreed upon discount level at a vendor location to be used within an agreed upon period of time. This discount is then applied by the app user at a participating bar of the program to receive a drink at the agreed upon discount level. The vendor, or bar, receives the full payment from the app user, as well as an agreed upon payment from the app, for a total payment of one purchase summed from two individual parties, the app user and the app. After each purchase, a lockout period is enabled to prevent the app user from making another purchase until said lockout period is deactivated. The process repeats after the lockout period is deactivated until the app user runs out of remaining discounts for the period. All transactions and information are transferred via one app platform. It should be appreciated that the innovation can be used for multiple goods and services via mobile app or any internet-connected device or apparatus.

The present innovation is a membership program and a mobile discounted payment solution that leverages a redistributed payment process to maximize value for the app user and the vendor. The app drives repeat customers to the vendors partaking in the program because app users save more money via discounts than they pay for the membership. From the vendor's perspective, they are providing a large discount to the app user, but also collect another payment from the app itself. The innovation works for both the app users and vendor as the app virtually breaks even, e.g. most or all of its memberships fees are paid back to the vendors as the app user makes purchases. Finally, this becomes a win-win situation for the app users and vendors as app users receive generous discounts while vendors access a market that normally would not have connected with them. For example, an app user can receive a 50% discount for an item. The vendor then receives that full 50% from the app user plus an additional 20% of the item price from the app, totaling 70%. So, the app user experiences a 50% discount while the vendor is technically only giving a 30% discount. The app user is then locked-out for a predetermined period of time from making more purchases, until the lockout period passes.

FIG. 1 shows the database system. The app user's information, such as name and password, is stored locally and in a central database. When a user signs up for a membership, a membership fee is collected from the user's credit card, PayPal, or other form of payment. This information is collected and stored via a credit card processor, such as Braintree Payments. When the user then proceeds to purchase a drink, a payment is processed via a saved credit card or other payment information on the app. The user has access to the bars in the program and to the drinks from each bar as the bar and drink information is stored in a central database. Via the vendor management system, a representative of a bar can edit bar information and add, subtract, or edit drinks and original drink prices, among other things. The administrator of the app can also access this database and manage bars and drinks within each bar. The bar or app administrator can access this database via the app or via a desktop or laptop. The database contains original price information. In an example, the app then displays 50% of the original drink price for the end user. The database also contains bank payment processing information for payment to bars. This data and information is stored within a central database. For example, the database is hosted on Amazon Web Services and contains information from SQL, Ruby, etc.

FIG. 2 shows the different types of data that can be secured. Data such as the passwords and security questions are encrypted for security. Data such as credit card numbers are hashed.

FIG. 3 shows the flow process as an app user purchases a drink and uses the app. When the user first opens the app, the user is prompted to the bar screen, which displays the available bars. To make any purchases, the user is required to register, which the user can do via the login page. Once the app user is logged in, has created an account on the app, and has chosen a membership level, the app user is prompted to the bar screen upon opening the app. The bar screen displays the bars participating in the membership program. The app user then chooses a bar by clicking on it and the app proceeds to show the drinks at the selected bar, in the menu screen. In the menu screen, the user can then select the different drinks and quantities of the drinks and choose a tip amount. After the user selects the drink and tip information, the user is then prompted to the order screen. The order screen is a confirmation page. The user shows the checkout page to the bartender serving the drink(s), and the bartender confirms the order by selecting either a unique code of the bar or by following the instructions on the screen. Once the order is placed, the user is prompted back to the menu page. After an order is placed, a lockout period, predetermined in the app, is enabled to prevent the app user from buying more drinks right after a previous purchase. After the lockout period is finished, the user can then purchase more drinks, until the next lockout period and then finally until the user redeems all purchased drinks for the membership period. This full cycle repeats for different bars and orders within those bars.

An Exemplary Machine Overview

Figure 5:
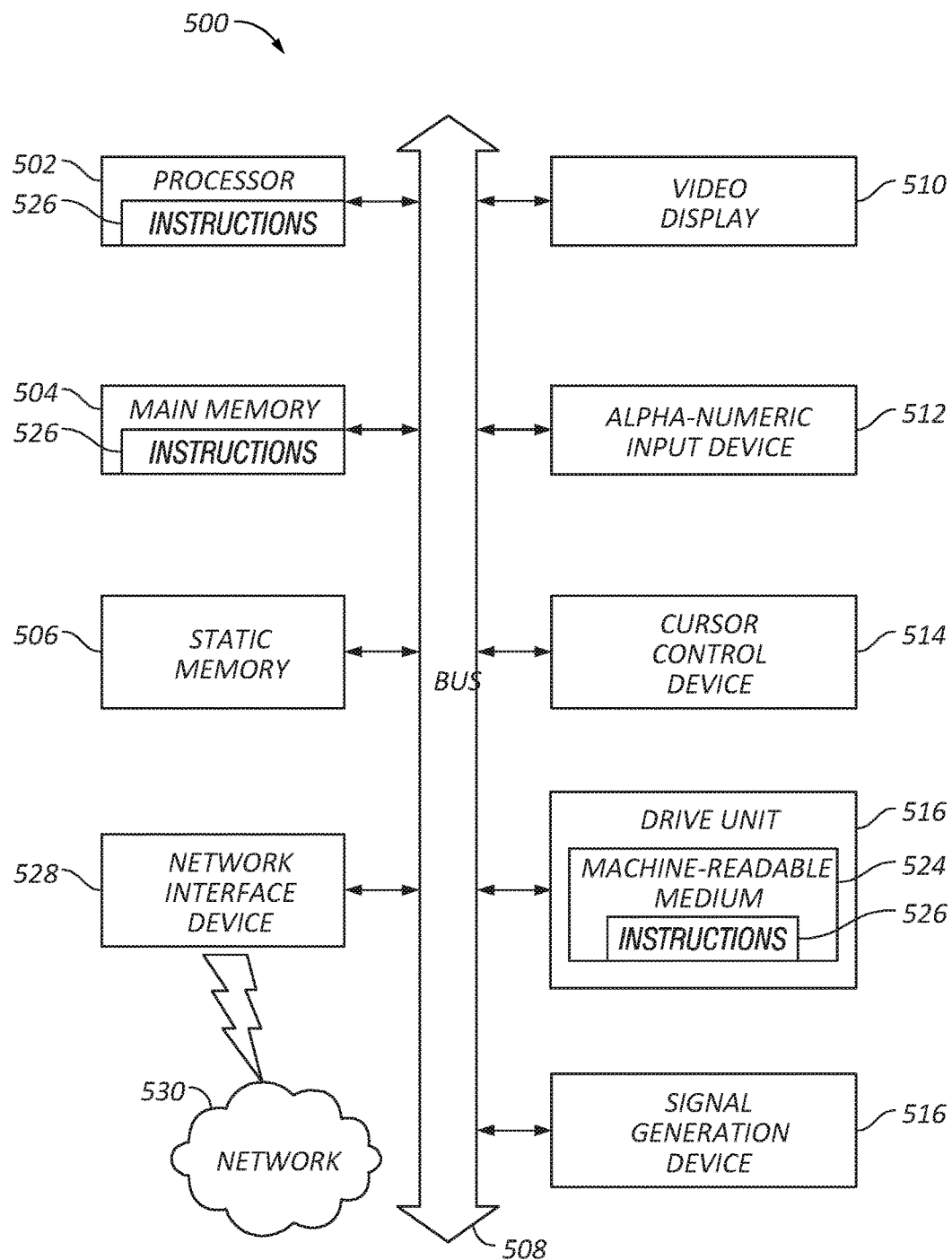
FIG. 5 is a block schematic diagram of a system in the exemplary form of a computer system according to an embodiment.

FIG. 5 is a block schematic diagram of a machine in the exemplary form of a computer system 500 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 500 includes a processor 502, a main memory 504 and a static memory 506, which communicate with each other via a bus 508. The computer system 500 may further include a display unit 510, for example, a liquid crystal display (LCD) or a cathode ray tube (CRT). The computer system 500 also includes an alphanumeric input device 512, for example, a keyboard; a cursor control device 514, for example, a mouse; a disk drive unit 516, a signal generation device 518, for example, a speaker, and a network interface device 528.

The disk drive unit 516 includes a machine-readable medium 524 on which is stored a set of executable instructions, i.e. software, 526 embodying any one, or all, of the methodologies described herein below. The software 526 is also shown to reside, completely or at least partially, within the main memory 504 and/or within the processor 502. The software 526 may further be transmitted or received over a network 530 by means of a network interface device 528.

In contrast to the system 500 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing computations with cloud computing. For the purposes of discussion herein, cloud computing may mean executing algorithms on any network that is accessible by internet-enabled devices, servers, or clients and that do not require complex hardware configurations, e.g. requiring cables, and complex software configurations, e.g. requiring a consultant to install. For example, embodiments may provide one or more cloud computing solutions on such internet-enabled devices, servers, or clients. It further should be appreciated that one or more cloud computing embodiments may use mobile devices, tablets, standard consumer devices, and the like.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A computer-implemented method for preventing an operation of a digital action in a database system in real-time based on a criterion, the method comprising:

displaying, by the database system, a first visualization of a plurality of vendors on a mobile device;

receiving, by the database system, an input from the mobile device indicating a selection of a vendor from the plurality of vendors from the first visualization;

displaying, by the database system, in response to receiving the input indicating the selected vendor, a second visualization of a plurality of different items associated with the selected vendor on the mobile device;

receiving, by the database system, an input from the mobile device indicating a selection of a first item from the plurality of different items from the second visualization;

displaying, by the database system, after receiving the input indicating the selected first item, an order screen on the mobile device, wherein the order screen presents (a) a discounted price for the selected first item in accordance with a membership associated with the mobile device, and (b) a barcode representing a purchase of the selected first item based on the discounted price;

reading, by the database system, the bar code from the order screen on the mobile device;

completing, by the database system, the purchase based on the bar code being read;

receiving, by the database system, an input from the mobile device indicating a selection of a second item from the plurality of different items after the purchase has been complete;

performing, by the database system, after receiving the input indicating the selected second item, a first level of verification associated with the membership;

based on the first level of verification failing, performing, by the database system, a subsequent action that had been preset, wherein the subsequent action causes the mobile device to be informative of how to remedy failure of the first level of verification;

determining that the first level of verification associated with the membership succeeded;

based on the determination that the first level of verification succeeded, performing, by the database system, a second level of verification based on the criterion, to enable an execution of a particular functionality of the database system, wherein the second level of verification comprises any of: whether a number of items including the selected first item electronically purchased in accordance with the membership during a predetermined amount of time is below a predetermined acceptable rate associated with the membership or if time since the purchase of the selected first item in accordance with the membership is greater than a predetermined acceptable length of time associated with the membership, wherein the particular functionality is electronically purchasing the second item as discounted in accordance with the membership based on the input indicating the selected second item;

determining that the second level of verification failed;

based on the determination that second level of verification failed, activating, by the database system, a lockout mechanism by i) causing at least the selected second item of the plurality of different items in the second visualization on the mobile device to be idle and not interactive until a reordering capability is re-enabled and thereby temporarily prevent the user from electronically purchasing at least the selected second item in accordance with the membership and ii) causing a notification window to be displayed presenting a countdown clock which counts down until a time that the reordering capability is re-enabled and that the user can place a next order via the second visualization;

based on the second level of verification succeeding, enabling, by the database system, the execution of the particular functionality; and determining that it is the time that the reordering capability is re-enabled;

based on the determination that it is the time that the reordering capability is re-enabled, causing the mobile device to vibrate and thereby indicate that the reordering capability is re-enabled and that user can electronically purchase at least the selected second item.

2. The method of claim 1, wherein the plurality of vendors are at least bars belonging to a particular bar membership.

3. The method of claim 1, wherein the plurality of different items associated with the selected vendor comprise alcoholic drinks.

4. The method of claim 1, wherein the selected first item in the second visualization and the selected second item in the second visualization each correspond to an alcoholic drink.

5. The method of claim 1, wherein performing the first level of verification comprises verifying, by the database system, a number of credits available towards purchasing the second selected item in the second visualization at a discounted price due to the membership.

6. The method of claim 1, wherein the subsequent action further comprises any of: displaying a message encouraging the purchasing of more credits; returning control to the any of the previous displaying steps; displaying interactive interface elements through which additional credits can be purchased; and providing an interactive interface element for upgrading a current membership level.

7. The method of claim 1, wherein the particular functionality further comprises selecting more items from the plurality of items in the second visualization.

8. The method of claim 1, wherein the particular functionality is purchasing the selected second item and further comprising:

transmitting, by the database system, a discounted purchase amount from a user to a bank account of a vendor of the plurality of items; and transmitting to the bank account of the vendor, by the database system, a fee associated with a membership fee paid by the user, wherein the membership fee is of a membership of which both the vendor and the user are parties.

9. The method of claim 1, causing the set of item graphics on the mobile client to be idle and not interactive further includes causing the second visualization of the different items associated with the selected vendor to become lighter in color compared to when second visualization is interactive and ordering capability is enabled.

10. A system comprising:
a server programmed to:

present a menu screen with a set of vendor graphics on a mobile client operated by a user;

receive a first input from the mobile client, wherein the first input selects a first vendor graphic from the set of vendor graphics;

present a set of item graphics on the mobile client after the first input has been received, wherein the set of item graphics is associated with the selected first vendor graphic;

receiving a second input from the mobile client, wherein the second input selects a first item graphic from the set of item graphics;

present an order screen on the mobile client after the second input has been received, wherein the order screen includes a content based on the first input and the second input, wherein the content includes (a) a numerical value associated with the selected first item graphic in accordance with a membership associated with the mobile client, and (b) a barcode associated with the numerical value;

read the bar code from the mobile client;

complete a transaction associated with the content based on the bar code being read;

receive a third input from the mobile client after the transaction is complete, wherein the third input selects a second item graphic from the set of item graphics;

perform a first level of verification associated with the mobile client after the third input has been received;

perform a preset action based on the first level of verification failing, wherein the preset action causes the mobile client to be informative of how to remedy failure of the first level of verification;

perform a second level of verification based on the first level of verification succeeding, wherein the second level of verification comprises any of: whether a number of items corresponding to the selected first item graphic electronically purchased in accordance with the membership during a predetermined amount of time is below a predetermined acceptable rate associated with the membership or if time since the than a predetermined acceptable length of time associated with the membership;

activate a lockout mechanism based on the second level of verification failing by i) causing the set of item graphics on the mobile client to be idle and not interactive until a reordering capability is re-enabled and thereby temporarily prevent the user from making any further electronic purchases associated with the set of item graphics including the second item graphic, ii) causing a notification window to be displayed presenting a countdown clock which counts down until a time that the reordering capability is re-enabled and that the user can place a next order via the second visualization:

enabling an execution of a function based on the second level of verification succeeding, wherein the function is making an electronic purchase asociated with the second item graphic based on the third input: and determining that it is the time that the reordering capability is re-enabled, and based on this determination, causing the mobile client to vibrate and thereby indicate that the reordering capability is re-enabled and that user can place a next order.

11. The system of claim 10, wherein causing the set of item graphics on the mobile client to be idle and not interactive further includes causing the second visualization of the different items associated with the selected vendor to become lighter in color compared to when the second visualization is interactive and ordering capability is enabled.

* * * * *